United States Patent
Lin

[19]

[11] Patent Number: 6,079,724
[45] Date of Patent: Jun. 27, 2000

[54] TRICYCLE

[76] Inventor: Idea Lin, P.O. Box 82-144, Taipei, Taiwan

[21] Appl. No.: 09/025,240

[22] Filed: Feb. 18, 1998

[51] Int. Cl.$^7$ ...................................................... B62M 1/04
[52] U.S. Cl. ............................ 280/221; 188/17; 280/252; 280/254; 280/282; 280/87.041
[58] Field of Search ..................................... 280/220, 221, 280/223, 252, 254, 264, 282, 7.17, 271, 272, 87.021, 87.041, 210; 188/17, 26, 68, 265

[56] References Cited

U.S. PATENT DOCUMENTS

| | | |
|---|---|---|
| 325,338 | 9/1885 | Hall . |
| 1,014,279 | 1/1912 | Auger . |
| 1,072,284 | 9/1913 | Widera . |
| 1,127,035 | 2/1915 | Linam . |
| 1,362,407 | 12/1920 | Foans . |
| 1,391,165 | 9/1921 | Best . |
| 1,449,643 | 3/1923 | Wenderhold . |
| 3,164,391 | 1/1965 | O'Neal . |
| 4,582,342 | 4/1986 | Lew et al. ................................. 280/221 |
| 5,848,660 | 12/1998 | McGreen ................................. 180/206 |

FOREIGN PATENT DOCUMENTS

| | | | |
|---|---|---|---|
| 253754 | 6/1926 | United Kingdom | .................... 280/221 |

*Primary Examiner*—Anne Marie Boehler
*Attorney, Agent, or Firm*—A & J

[57] ABSTRACT

A tricycle includes a base plate, and two pedals and a brake pedal arranged near the rear end of the base plate. The pedals are each connected to a rack rod. The base plate has two lugs at both sides, and a rotary shaft is pivotally mounted at the lugs. The rotary shaft includes a friction roller in the middle and two ratchet wheels near both ends thereof. Compression springs are disposed between the base plate and the three pedals. By pressing the two pedals, the ratchet wheels on the rotary shaft will rotate to cause two large wheels mounted at both ends of the rotary shaft to move forward. The ratchet rods are reset by the springs to get ready for the next action. The brake pedal includes a brake lever at a lower end thereof. When the brake lever displaces downwardly, the friction roller will be pressed to stop rotation of the rotary shaft. A wheel mounting frame is disposed near a front end of the base plate for mounting a small wheel. A retractable lever is disposed on the base plate and connected to the wheel mounting frame. The retractable lever is provided with a steering frame-shaped handle. When the pedals are continuously pressed, the large wheels will be brought to move forward.

1 Claim, 7 Drawing Sheets

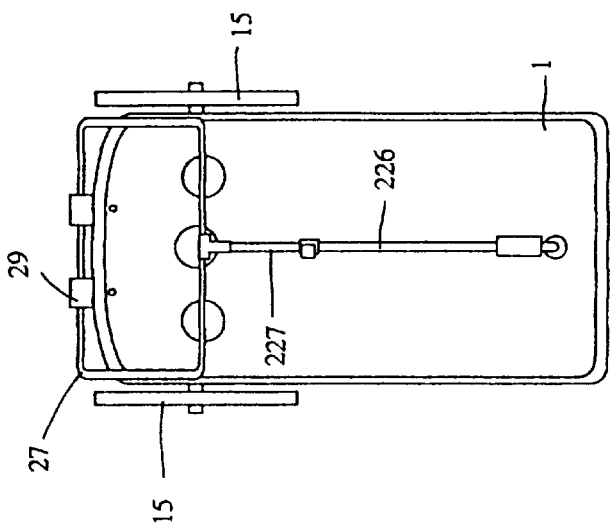
FIG. 8
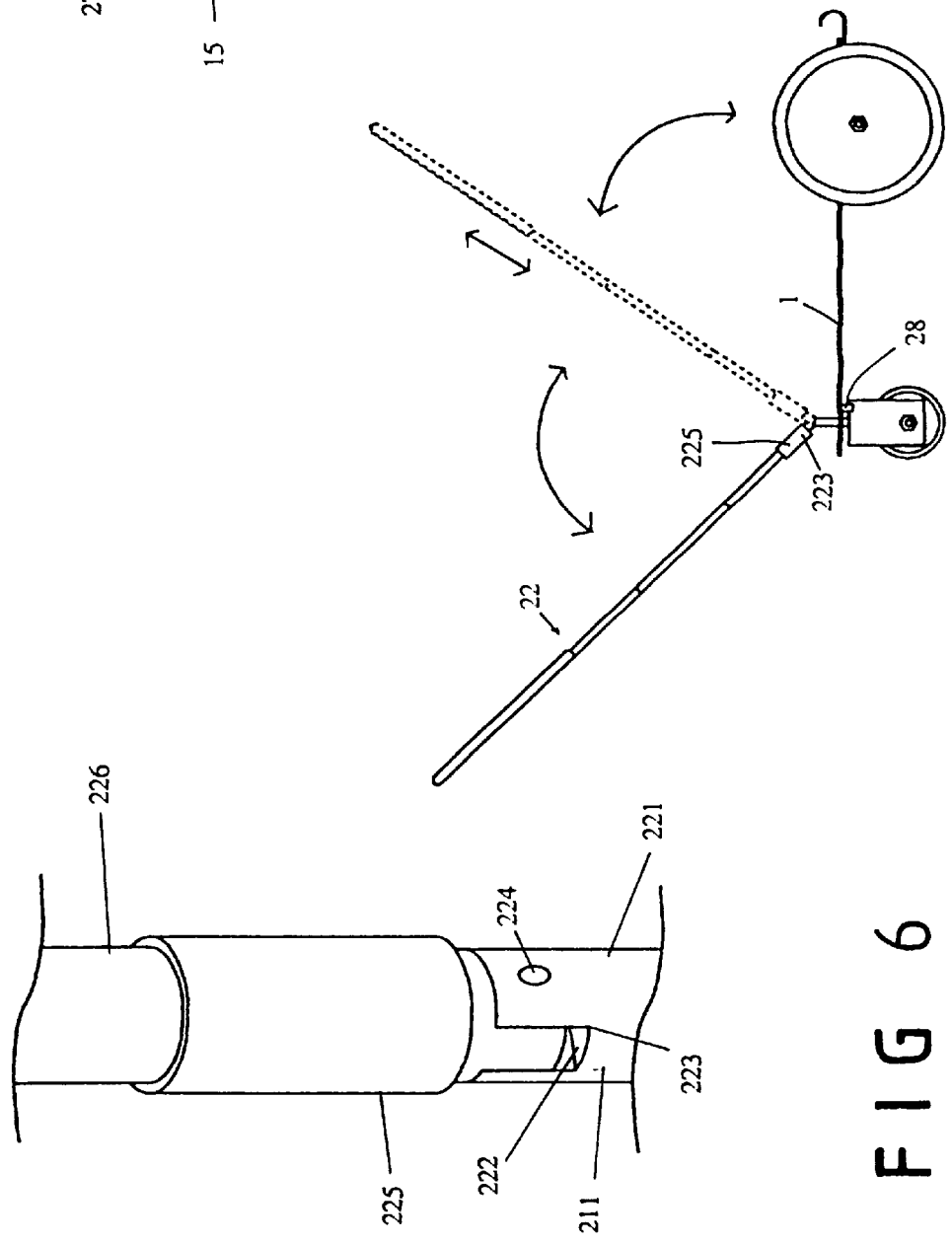
FIG. 9
FIG. 6

TRICYCLE

BACKGROUND OF THE INVENTION

1. Field of the Invention

The present invention relates generally to a tricycle, and more particularly to a new tricycle that is lightweight and utilizes the weight of the rider to exert pressure on rack rods to drive the wheels of the tricycle.

2. Description of the Prior Art

Bicycles have a long history. Bicycles utilize two wheels that cooperate with a pedal unit, chains, and gears, and they can be steered by controlling the front wheel via the handlebars. Bicycles are however comparatively bulky and cannot be carried around. There has been developed a kind of collapsible bicycle that is only about half the size of ordinary bicycles. But such collapsible bicycle is still comparatively heavy to carry around. It is therefore desirable to provide a means of transportation which is light-weighted for carrying around and which is manually driven.

SUMMARY OF THE INVENTION

The present invention relates generally to a tricycle, and more particularly to a new tricycle that is lightweight and utilizes the weight of the rider to exert pressure on rack rods to drive the wheels of the tricycle.

A primary object of the present invention is to provide a new tricycle, which moves and operates by means of a completely new power transmission mechanism. The tricycle of the invention includes two large wheels and one small wheel. By continuously pressing two pedals on a base plate so that rack rods below the pedals displace downwardly to rotate ratchet wheels on a rotary shaft, the large wheels mounted at both ends of the rotary shaft can be driven to move forward. Compression springs are disposed in the pedals. The small wheel is disposed near a front end of the base plate and mounted in a wheel mounting frame. A retractable lever is arranged on the front end of the base plate and connected to the wheel mounting frame. The retractable lever includes a frame-shaped handle for steering the tricycle via the small wheel. A brake pedal is disposed between the pedals and includes a brake lever that may displace downwardly to press against the rotary shaft to brake the large wheels. The retractable lever may be folded to decrease the overall size of the tricycle for storage. The tricycle of the invention is also light-weighted to facilitate carrying. Besides, the tricycle of the invention may be utilized as a means of transportation or an exer-bike.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 6 is a perspective view of the connector according to the present invention;

FIG. 8 is a top view of the present invention in a folded state; and

FIG. 9 is a right side view of the illustrating the swinging movement of the retractable lever of the present invention when it is being folded.

DETAILED DESCRIPTION OF THE PREFERRED EMBODIMENT

Figure 1:
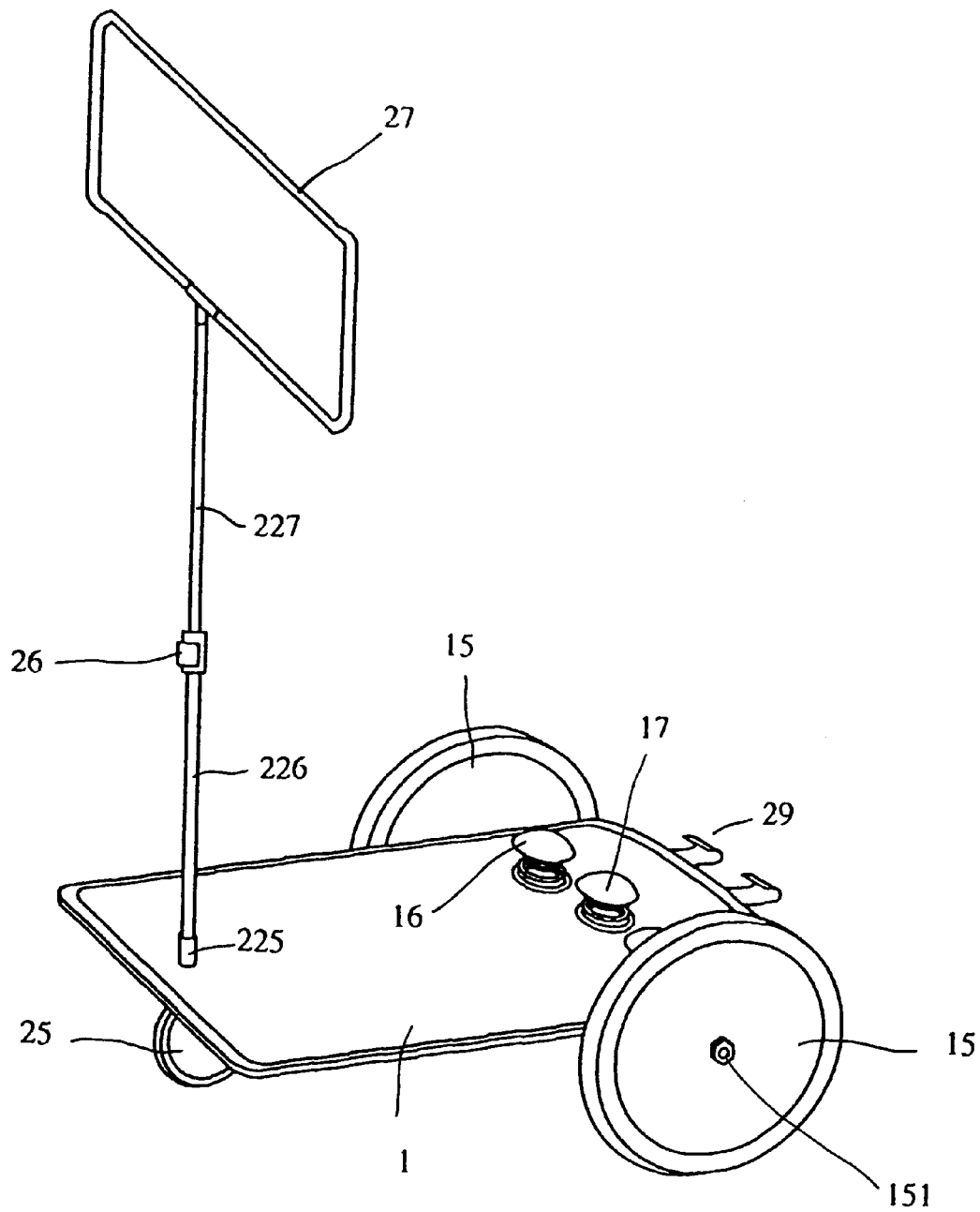
FIG. 1 is a perspective view of the present invention.
Figure 2:
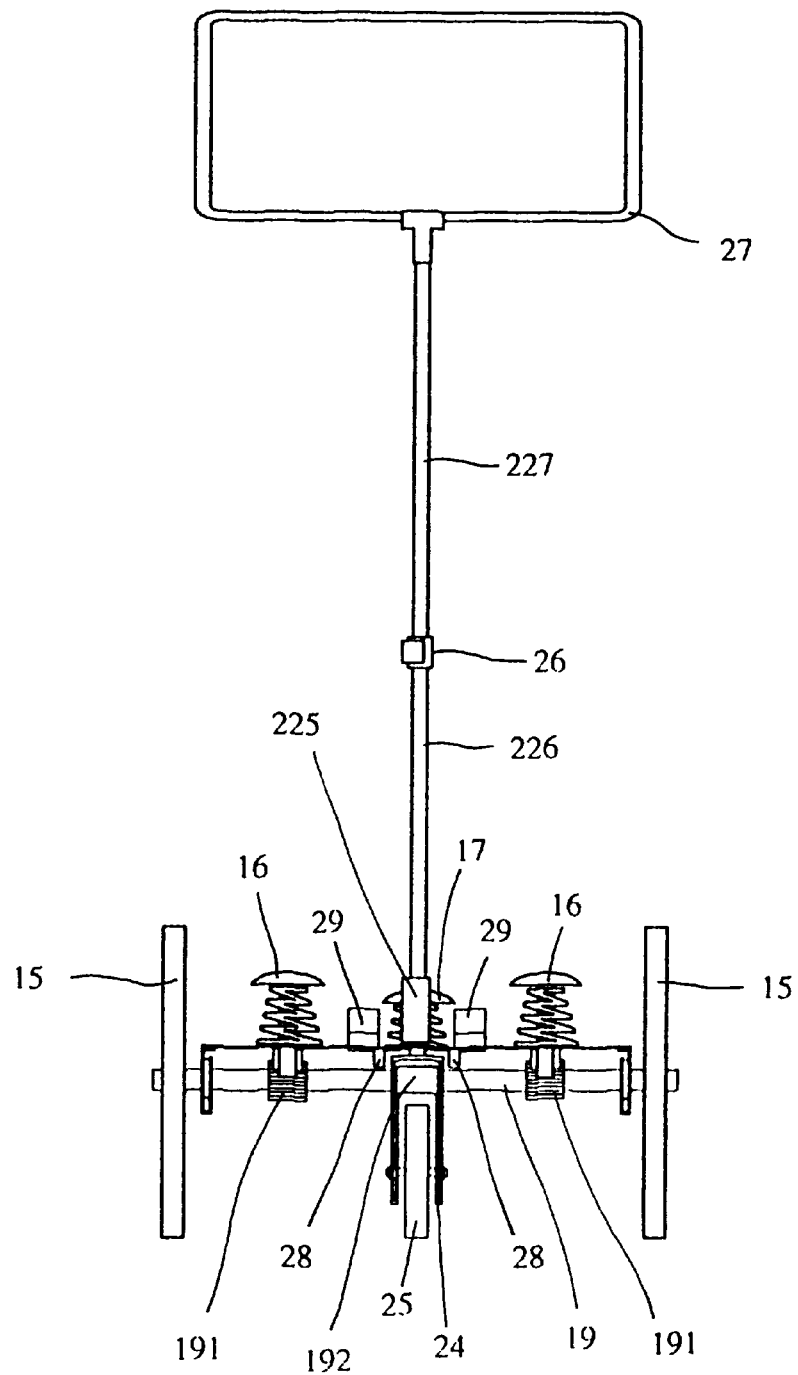
FIG. 2 is a front view of the present invention.
Figure 3:
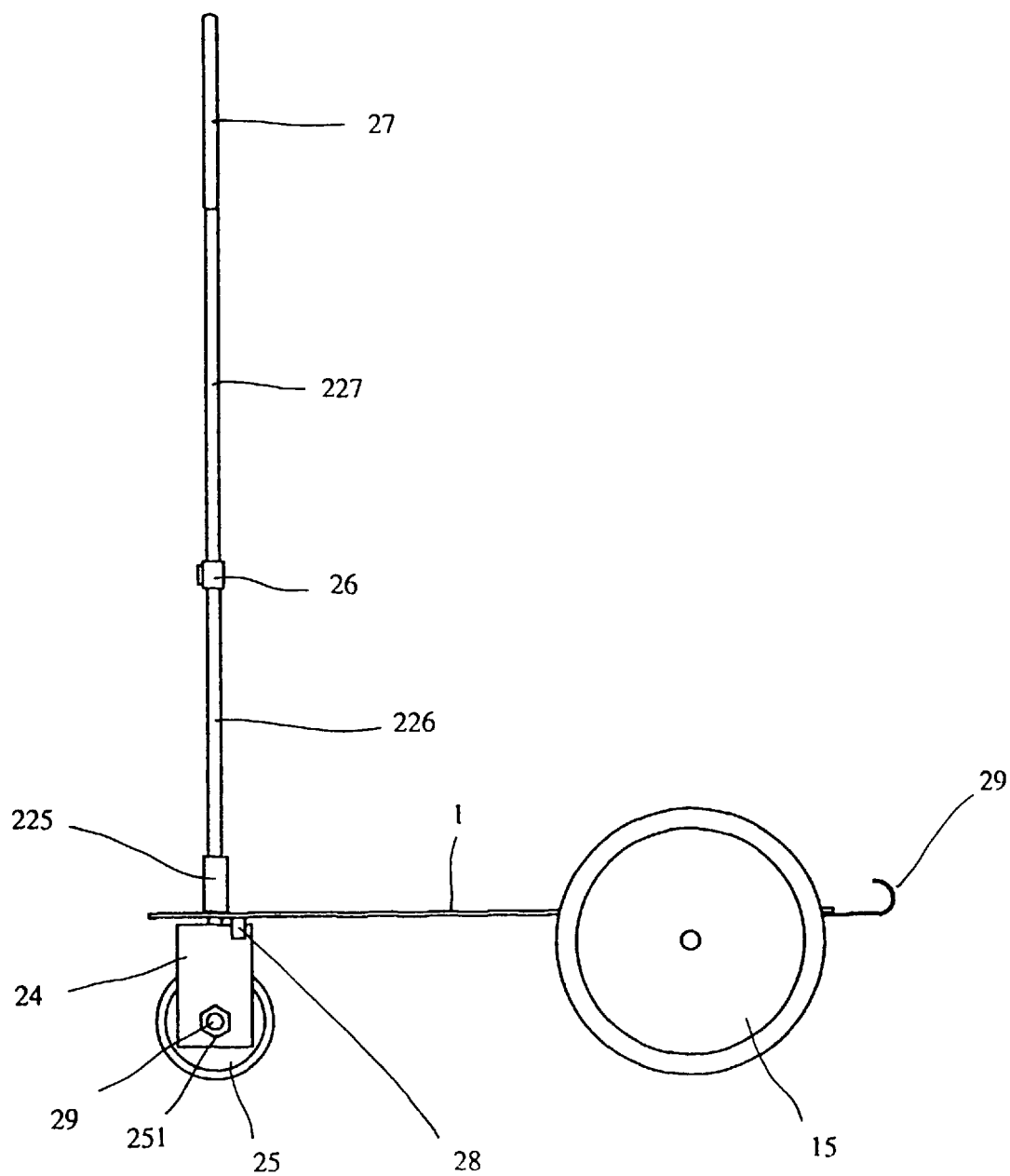
FIG. 3 is a side view of the present invention.
Figure 4:
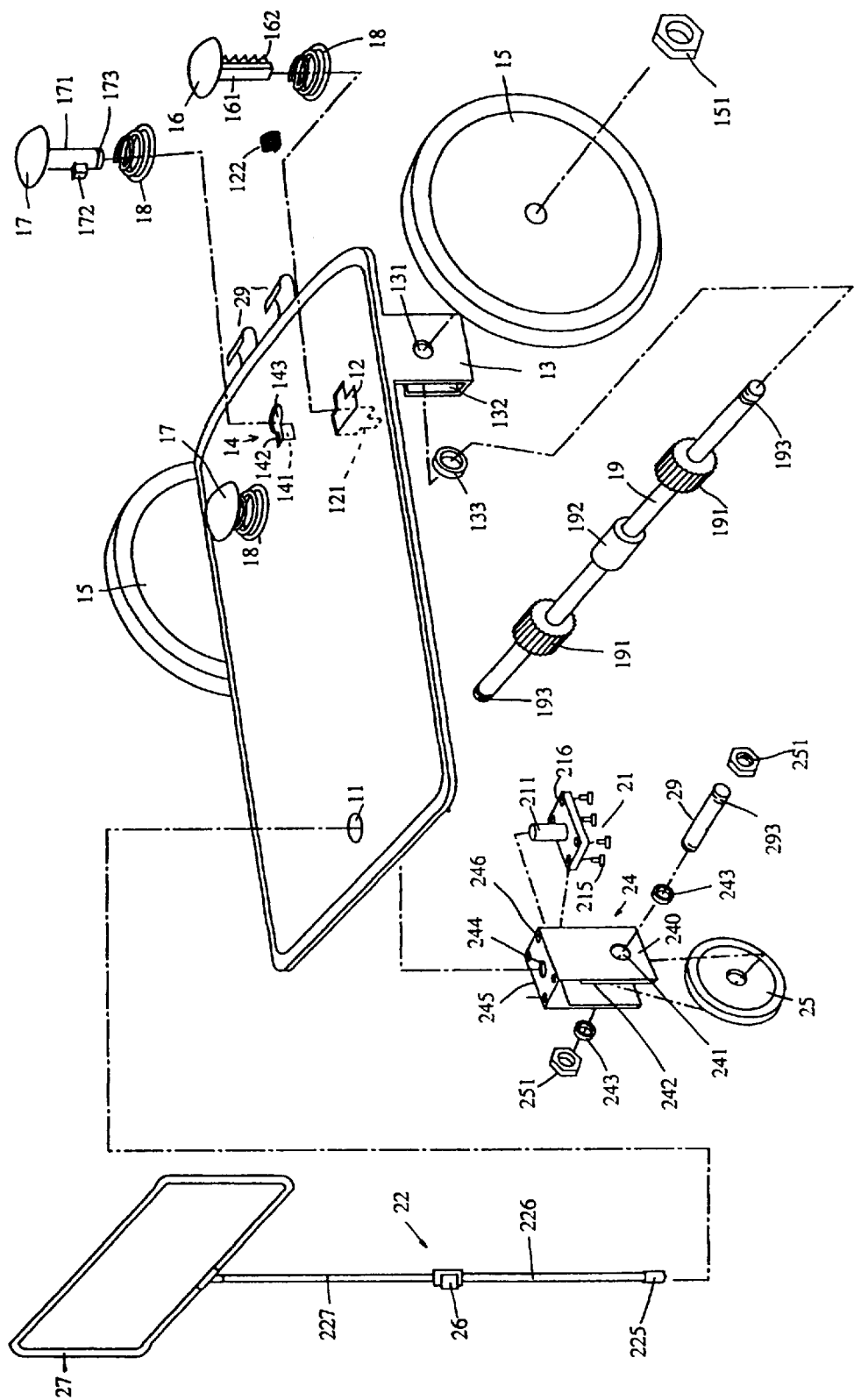
FIG. 4 is a perspective exploded view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 5:
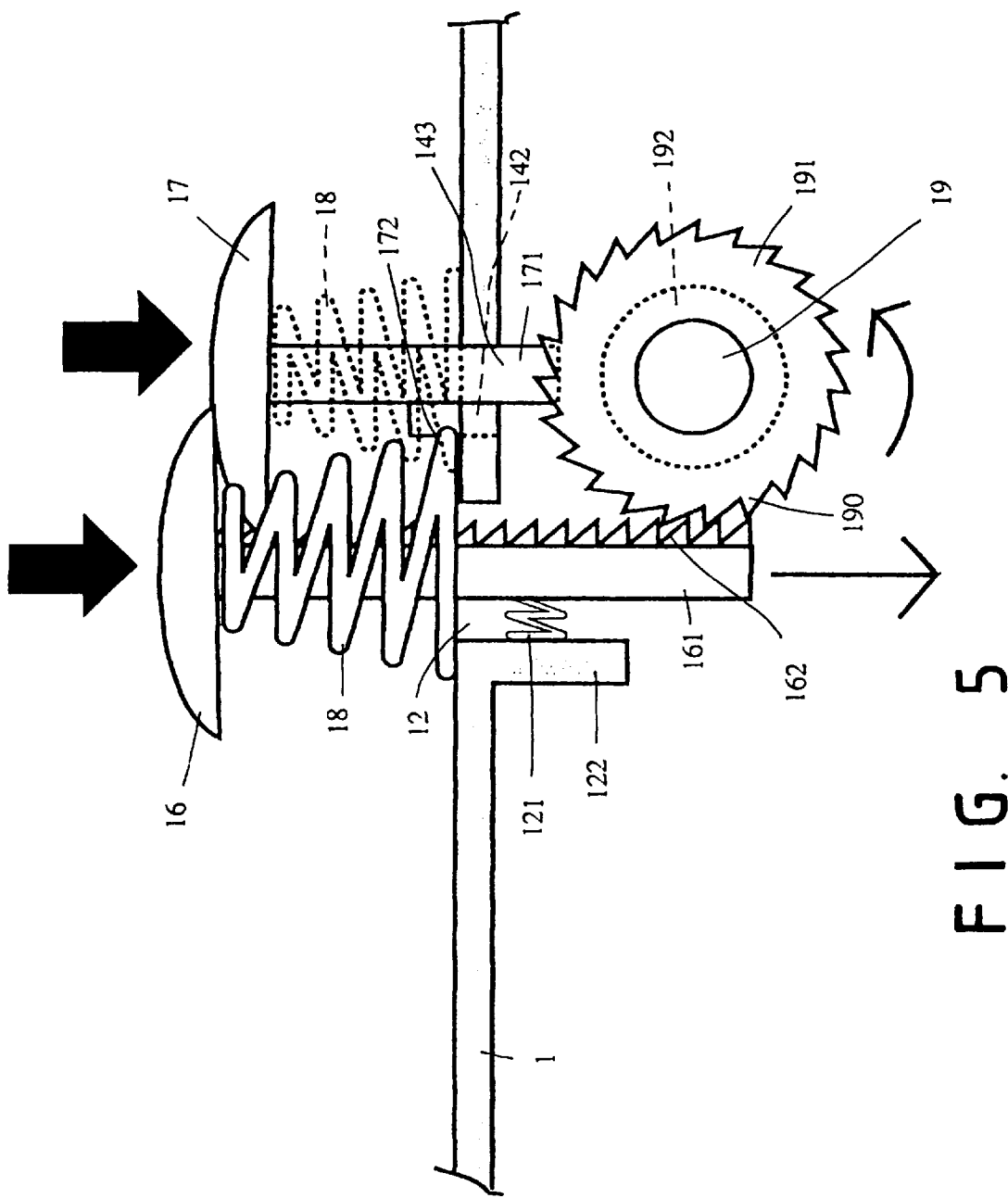
FIG. 5 is a schematic view illustrating the action of the pedals of the present invention.

As shown in FIGS. 1–7, the new tricycle according to the present invention has a base plate 1, and two pedals 16 and a brake pedal 17 disposed near a rear end of the base plate 1. The pedals 16 and 17 respectively pass through holes 12 and 14. The holes 12 are protruding and the portions of the plate at the holes 12 are bent forwardly and downwardly to form abutting plates 122. The hole 14 includes a quadrilateral hole portion 142 and a circular hole portion 143, the hole 14 being nearer to the rear end of the base plate 1. The quadrilateral hole portion 142 also bends to one side to form a limiting plate 141. In addition, the pedals 16 at both sides each include a circular bulge and a rack rod 161 having one end connected to the bottom side of the circular bulge, the rack rod 161 having a toothed portion 162 at its rear side. Each rack rod 161 passes through the corresponding hole 12. The base plate 1 is further provided with two lugs 13 at both sides thereof respectively corresponding to both sides of the brake pedal 17. Each lug 13 is bent into an L-shape having an inner surface 132, the lug 13 and the inner surface 132 thereof being both provided with a middle hole 131. A bearing 133 is disposed between the middle holes 131 of each lug 13. A rotary shaft 19 is mounted between the lugs 13 at the bottom side of the base plate 1 such that the ends of the rotary shaft 19 respectively pass through the middle holes 131 and the bearing 133 disposed between the middle holes 131 of each lug 13. The rotary shaft 19 has threaded ends onto which nuts 151 are respectively fitted. Two large wheels 15 are respectively mounted at both threaded ends of the rotary shaft 19 and secured in place by the nuts 151. The rotary shaft 19 further has a friction roller 192 in the middle and two ratchet wheels 191 near both sides thereof. The toothed portion 162 of the rack rod 161 may be caused to engage several of the ratchet teeth 190 of the ratchet wheels 191, as shown in FIG. 5. When the pedals 16 are pressed, the toothed portions 162 of the rack rods 161 obtain the necessary power to start driving the ratchet wheels 191 engaged therewith. The ratchet teeth 190 turn in a single direction so that the ratchet wheels 191 may only turn unidirectionally. Furthermore, the rack rods 161 of the pedals 16 are each fitted with a retractable spring 18 on the outside up to the upper side of the base plate 1. By continuously pressing the pedals 16 to drive the ratchet wheels 191 on the rotary shaft 19, the large wheels 15 may be driven to move forward, which also cause the rack rods 161 to be constantly rebounded by the springs 18 to get ready for the next action. The toothed portion 162 will not affect the rotation of the ratchet wheels 191 during retrieval thereof. The pedals 16 on the base plate 1 may be worked alternately to cause the rotary shaft 19 to rotate continuously so that the large wheels 15 keep on bring the base plate 1 forward. Additionally, another spring 121 may be disposed in front of each abutting plate 122 and the corresponding rack rod 161. The spring 121 has one end fixed on the surface of the abutting plate 122 to permit tight connection between the rack rod 161 and the corresponding ratchet wheel 191 when the former is being pressed downwardly, thereby providing enhanced power transmission effect.

The brake pedal 17 is disposed in the middle. The brake pedal 17 has a brake lever 171 connected to a bottom side thereof, the brake lever 171 being externally fitted with a retractable spring 18 up to the upper side of the base plate 1. A bottom end of the brake lever 171 is connected to a brake packing 173, while a retaining block 172 is disposed at a front side of the brake lever 171 to pass into the quadrilateral hole portion 142 of the hole 14. Hence, by pressing the brake pedal 17 to cause it to turn, the brake lever 171 can be rotated to cause an upper end of the retaining block 172 to engage a bottom side of the base plate 1, stopping the large wheels 15 from motion. When the brake pedal 17 displaces downwardly, with the brake packing 171 pressing against the friction roller 192 of the rotary shaft 19, the rotary shaft 19 will be stopped, as shown in FIG. 5.

The present invention further comprises a mechanism for steering the new tricycle. A small wheel 25 is mounted near a front end of the base plate 1 by means of a wheel mounting frame 24 which is substantially inverted U-shaped. Both sides of the wheel mounting frame 24 are bent inwardly into an L-shape respectively so that it has inner surfaces 242 and outer surfaces 241. Both the inner surfaces 242 and the outer surfaces 241 at both sides of the wheel mounting frame 24 are provided with a through hole 241. A bearing 243 is mounted between the outer surface 241 and inner surface 242 of each side of the wheel mounting frame 24 by means of a short shaft 29 that has two threaded ends 293 that pass through the respective through holes 241 at both sides of the wheel mounting frame 24, with nuts 251 locking the threaded ends 293. A pivot block 21 is further disposed below a straddle portion 245 of the wheel mounting frame 24. The pivot block 21 has a shaft 211 that passes through a central hole 244 of the straddle portion 245, and the pivot block 21 has four corners that are respectively secured to the straddle portion 245 by means of small screws 215 passing through through holes 216 of the pivot block 21 and screw holes 246 of the straddle portion 245 f the wheel mounting frame 24, so that the pivot block 21 and the wheel mounting frame 24 may be connected as a whole. The shaft 211 further passes through a through hole 11 in the base plate 1 and is connected to a bottom end of a control lever. The control lever may be a retractable lever 22.

Figure 7B:
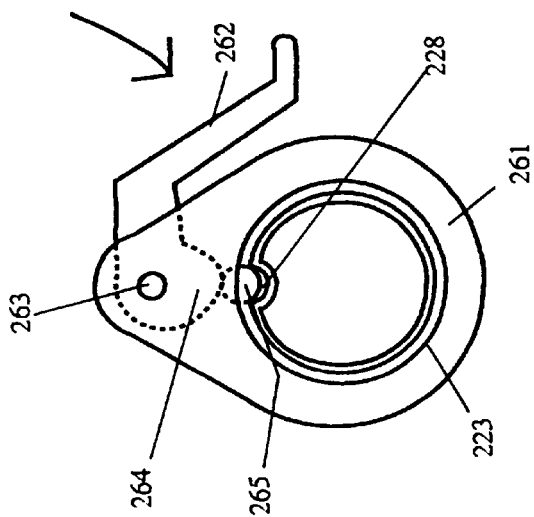
FIG. 7B is a schematic view showing the control section in a fastened state.
Figure 7A:
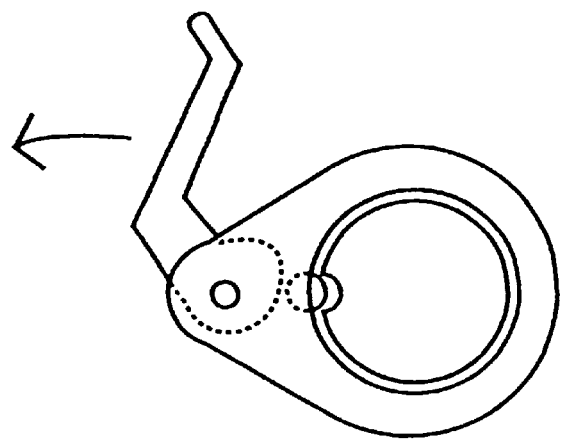
FIG. 7A is a schematic view showing the control section in an unfastened state.
Figure 7:
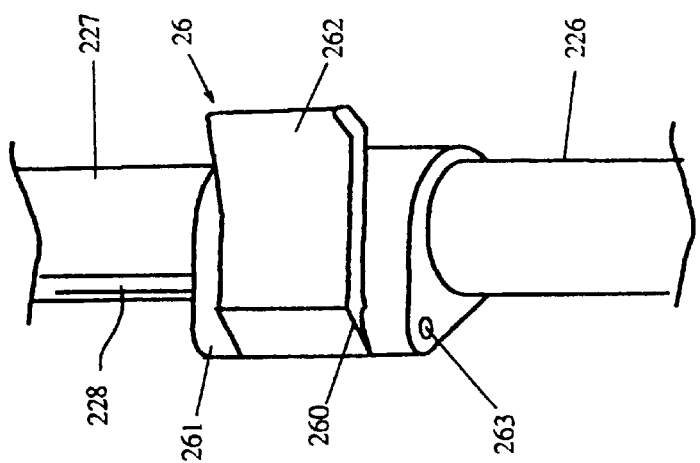
FIG. 7 is a right side view of the control section according to the present invention.

The retractable lever 22 has a connector 211 at its bottom end and is screwably coupled to the upper end of the shaft 211. The retractable lever 222 may have a plurality of sections. In this preferred embodiment of he present invention, the retractable lever 222 has two sections 226 and 227. The lower section 226 has a lower end fitted with a securing cap 225 which also fits onto the connector 221. As the lower section 226 is coupled to the connector 221 utilizing lugs 223 and recesses 222 by means of screws 224 an nuts or pins 224, when the securing cap 225 is pulled upwardly, as shown in FIGS. 6 and 9, the retractable lever 22 may swing back and forth to allow the retractable lever 22 to be closed upon the base plate 1, as shown in FIG. 8. The lower section 226 of the retractable lever 22 receives the upper section 227 disposed therein, with a control section 226 therebetween, as shown in FIGS. 7, 7A and 7B. The control section includes a sleeve 261 and a press block 265. The sleeve 261 has a notch 260 connected by a pin 263 to a rotary handle 262. The rotary handle 262 has a pointed portion 264 urging against the press block 265, which in turn presses against a depression 228 of the upper section 227 so as to fix the height of the upper section 227. A manually controllable steering handle 27 in the form of a frame is fixedly connected to the upper section 227. The control section 226 may also be secured by means of screws. Furthermore, a projection 28 is disposed at either side of the wheel mounting frame 24 to control and restrict the angle of turning of the handle 27, within 45 degrees for instance. A pair of light reflecting plates 30 is provided at the rear end of the base plate 1. The reflecting plates 30 are hook-shaped and provided to fasten the handle 27 of the retractable lever 22 to facilitate lifting of the new tricycle of the invention.

The structure of the new tricycle of the present invention should be clear in view of the above description. In summary, a steering small wheel is disposed at the front end of the base plate and two large wheels are disposed at both sides of the rear end of the base plate. By working the pedals on the base plate, the large wheels can be driven to propel the tricycle of the invention. In general, the small wheel is approximately 10 cm high while the large wheels are approximately 30 cm high; the base plate is 40 wide and 60 cm long; and the retractable lever including the handle may be 60–120 cm long. The handle should have sufficient width to facilitate gripping. The base plate should also has sufficient height for the pedals. The toothed portion of the rack rod should have at least 6 cm for displacement and driving purposes. The size of the relevant components of the tricycle of the invention is configured to meet actual requirements and allow smooth operation. If the retractable lever is configured to be slanting, the tricycle of the invention may be used as a tow cart (see FIG. 9) for loading or unloading purposes. Briefcases may also be placed on the base plate. The tricycle of the invention is collapsible for easy storage and carrying.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A tricycle, comprising:

a base plate, said base plate having a pivot hole near a front end thereof, and three holes near a rear end thereof such that a first and second of said holes are arranged nearer to both sides of said base plate respectively, with a third hole disposed in the middle between said first and second holes but nearer to the rear end of said base plate, said base plate further having a pair of lugs disposed at both sides thereof near said third hole;

a rotary shaft, said rotary shaft being pivotally mounted at said lugs of said base plate and including a friction roller in the middle and orienting towards said third hole, and two ratchet wheels at both sides respectively and orienting towards said first and second holes respectively, with ratchet teeth orienting forwardly;

a pair of pedals, said pedals each including a pedal element at an upper end thereof and a rack rod at a lower end thereof and connected to said pedal element above, said rack rod having a toothed portion orienting rearwardly such that they may engage said ratchet teeth of the corresponding ratchet wheel, said rack rod being further fitted with a compression spring between an upper side of said base plate and said rack rod;

a brake pedal, said brake pedal having a pedal element at an upper end thereof and a brake lever with a brake packing at a lower end thereof and connected to said pedal element thereof, said brake lever being capable of contact with said friction roller and fitted with a compression spring up to the upper side of said base plate such that said tricycle may be braked when said brake pedal is pressed;

a pair of large wheels, pivotally mounted at both ends of said rotary shaft respectively;

a wheel mounting frame, said wheel mounting frame being disposed below said base plate and having an upper end extending through said pivot hole of said base plate;

a small wheel, said small wheel being pivotally mounted in said wheel mounting frame; and a control lever, said control lever having a lower end connected to said wheel mounting frame and a handle at an upper end adapted to steer said tricycle;

the portions of said base plate at said first and second holes thereof being bent forwardly to form respective abutting plates, said abutting plates each being connected to a spring that extends to a surface of the corresponding rack rod;

whereby when said pedals are pressed continuously, said rotary shaft is caused to rotate forwardly to drive said tricycle forward.

* * * * *